Nov. 3, 1936.   B. DICK   2,059,444

FLUID PRESSURE MECHANISM

Filed May 29, 1933

Inventor
BURNS DICK

By E. G. Huffman

Att'y.

Patented Nov. 3, 1936

2,059,444

UNITED STATES PATENT OFFICE 2,059,444

FLUID PRESSURE MECHANISM

Burns Dick, Ferguson, Mo., assignor to Wagner Electric Corporation, St. Louis, Mo., a corporation of Delaware Application May 29, 1933, Serial No. 673,366

10 Claims. (Cl. 60—54.6)

My invention relates to fluid pressure mechanism and more particularly to improvements in the compressor or master cylinder apparatus of a hydraulic brake system which embodies means for compensating for any volumetric deficiencies or excesses of the liquid in the system. In compressors of this type it has been the practice to provide a compensating passage between the cylinder and the reservoir which is uncovered when the piston of the compressor is in its retracted position, as for example, the structure disclosed in my Patent No. 1,786,231 issued December 23, 1930. It is necessary that this passage be placed sufficiently ahead of the piston cup to allow for the maximum manufacturing tolerances and as a result, considerable fluid is forced out of the system during the initial movement of the piston prior to the "cutting off" of the passage, and substantial movement of the piston actuating foot pedal must precede development of any braking pressure.

One of the objects of my invention is to construct a compressor of the type referred to in which the compensating passage will be normally closed when the piston is in its retracted position but which will be opened to permit fluid to be forced out of the cylinder if the pressure of the fluid in the cylinder exceeds a predetermined value.

Other objects are to produce a compressor of the compensating type which is more efficient in operation, easier to manufacture, and one in which the life of the piston packing cup will be increased.

Figure 1:
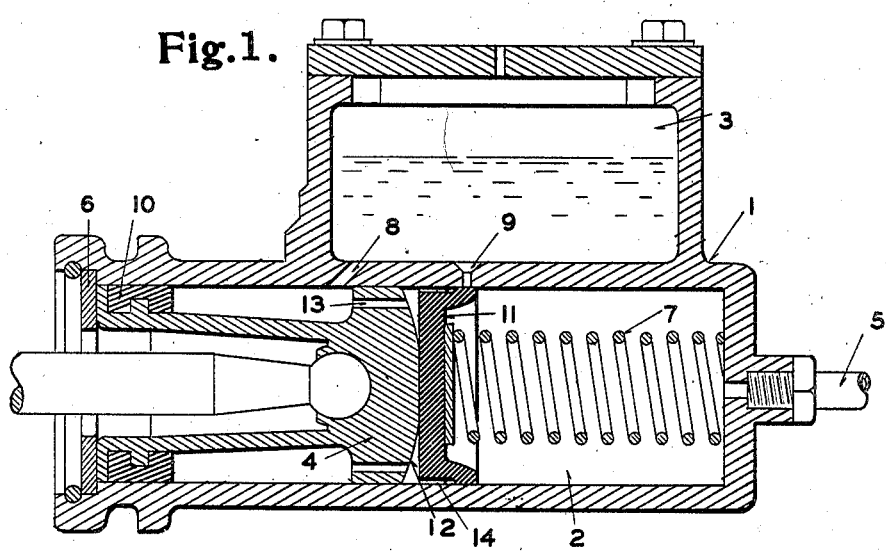
Figure 2:
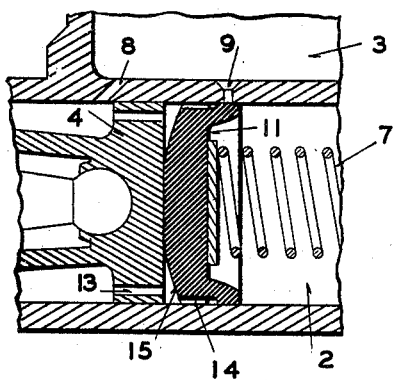
Figure 1A:
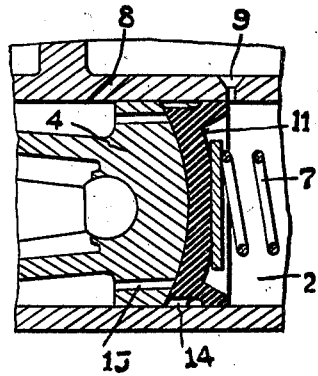

Still other objects will become apparent from the following description of my invention, taken in connection with the accompanying drawing, in which Figure 1 is a cross sectional view of a compressor for a hydraulic brake system, Figure 1A is a cross sectional view of the packing cup in flexed position, and Figure 2 is a modified construction.

Referring in detail to Figures 1 and 1A, the numeral 1 indicates a compressor or master cylinder of the compensating type which is provided with a cylinder 2, a reservoir 3, and a piston 4. The cylinder 2 is in communication with the brake actuating fluid motor (not shown) by means of conduit 5. The piston 4 is normally biased to its retracted position against the stop 6 by means of the spring 7. The reservoir is in communication with the cylinder by means of a pair of passages 8 and 9, the passage 8 communicating with the cylinder at the rear of the piston head and the passage 9 (commonly referred to as the compensating port) communicating with the cylinder ahead of the piston when said piston is in its retracted position. The rear end of the piston 4 is provided with a suitable packing 10 to prevent fluid from leaking out of the compressor.

The piston head is also provided with a packing cup 11 of rubber or other flexible material, to prevent the leakage of fluid past the piston head when the piston is operated to force fluid into the brake actuating motors. In prior constructions the piston head was provided with a flat surface in engagement with the flat base surface of the cup, and the lip of the cup was adapted to lie back of the passage 9 when the piston was in its retracted position. The purpose of having the passage 9 open in the retracted position of the piston was to permit interchange of fluid between the cylinder and the reservoir to compensate for any excesses or deficiencies in the system due to the expansion of the fluid by heat, leakage of fluid, etc. Due to manufacturing tolerances, the lip of the cup was generally some distance to the rear of the passage 9 when the piston was in its retracted position, thus resulting in loss of fluid from the cylinder during the initial movement of the piston.

In accordance with my invention I have provided the head of the piston 4 with a substantially convex surface 12, the central portion, however, remaining flat to provide a seat for the cup 11. I also so position the passage 9 with respect to the cup that the forward edge of the lip of the cup will be ahead of the passage in the retracted position of the piston. The construction is such that the distance of the forward edge of the cup ahead of the passage 9 is not greater than the distance between the peripheral edge of the piston head and the adjacent peripheral edge of the base of the cup, thus permitting the cup to be flexed back over the head of the piston and allow communication between the reservoir and the cylinder (see Figure 1A). The head of the piston 4 is provided with the usual openings 13 and the wall of the cup provided with grooves 14, the purpose of which is to permit fluid to flow readily from the rear of the piston to the cylinder space ahead of the cup on the return stroke of the piston, (the lip of the cup flexing inwardly to permit this flow).

In operation of my improved master cylinder, when the piston is operated to apply pressure to the brake actuating motors, the fluid present in the cylinder ahead of the cup will not flow out of the passage 9 during the initial movement as this is prevented by the position of the lip of the cup, thus saving a portion of the piston travel which was lost in the prior constructions. Upon the return stroke of the piston from applied position, fluid at the rear of the piston head will flow through the openings 13 and grooves 14 and past the lip of the cup and prevent the creation of a vacuum in the cylinder prior to the forcing of fluid back into the cylinder from the brake applying motors by the brake shoe release springs. Also, upon the return stroke of the piston, the fact that the base of the cup will not lie flat upon the convex surface of the head of the piston and cover the openings 13, as would be the case if the cylinder head were not provided with a convex surface, fluid at the rear of the piston will be able to flow very readily through the opening 13 and the groove 14, thus producing an improved action.

Another advantage of this construction is that the lip of the cup will be forced radially outwardly upon the forward stroke of the piston by the tendency of the cup to flex back onto the convex surface, thereby creating a greater pressure between the wall of the cup and the wall of the cylinder and less possibility of leakage on the forward stroke of the piston. My invention also results in maintaining the fluid in the system under a slight pressure upon the piston's return to its retracted position. The presence of the pressure is useful to hold the lips of the brake actuating piston packing cups against their cylinder walls to prevent leakage of fluid.

By placing the forward edge of the lip of the cup ahead of the passage 9, I am also able to increase the life of the cup since the edge of the cup is not subject to being cut by the edge of the wall of the passage 9 during the operation of the piston. Also, because of the fact that the cup does not have to slide past the passage 9 upon each movement of the piston, I am able to increase the size of the passage, thus making such opening much easier to drill, and eliminating much breakage and bending of the drill bits which occurs in the manufacture of the present construction.

By the use of my invention the compensation for excesses and deficiencies of the liquid in the system, during a long period when the piston is in its retracted position, is also readily permitted as, for example, if the volume of fluid in the cylinder should increase, due to increase in temperature, the increased pressure created in the system would cause the cup to flex back on the piston head and thereby open the passage 9 and relieve the system of its excess volume of fluid. If there should be a decrease in the volume of fluid in the system when the piston is in its retracted position, such will be readily replenished by the flow of fluid from the rear of the piston past the lip of the cup by way of the openings 13 and grooves 14.

Referring to Figure 2, I have shown a modified construction wherein the piston head is provided with the usual flat surface and the base of the packing cup 11 is provided with a convex surface 15 having a flat portion at its center. The construction otherwise is the same as that shown in Figure 1 and the operation of the device is identical with that previously described. The construction of Figure 2, however, has the advantage that it is possible to embody my invention in existing compressors by merely substituting the packing cup shown for the packing cup of prior constructions. Such substituted packing cup would be so dimensioned that the forward edge of the lip will be forward of the passage 9 when the piston is in retracted position.

Having fully described my invention, what I claim as new and desire to secure by Letters Patent of the United States is:

1. In fluid pressure mechanism, a cylinder, a piston therein, a reservoir, means forming a passage through the cylinder wall and communicating with the reservoir, and means for normally preventing communication from the cylinder to the reservoir when the piston is in its fully retracted position but capable of movement relative to said piston when the piston is in said retracted position for permitting such communication when the pressure of the fluid in the cylinder exceeds a predetermined value, said means being movable with the piston during the pressure stroke of the piston.

2. In fluid pressure mechanism, a cylinder, a piston therein, a reservoir, said cylinder being provided with a fluid passage through its wall and communicating with the reservoir, and an element normally preventing communication from the pressure end of the cylinder to the reservoir through said passage when the piston is in its retracted position but movable relative to the piston when the latter is in said retracted position and under the influence of fluid pressure in the cylinder to permit the passage of fluid from the cylinder to the reservoir, said element lying within the cylinder and movable with the piston during its pressure stroke.

3. In fluid pressure mechanism, a cylinder, a piston therein, a reservoir, means forming a passage between the reservoir and the cylinder, and a flexible packing cup for the piston having a forward sealing edge normally located forward of said passage when the piston is in fully retracted position, said sealing edge being so positioned with respect to the piston as to be free to be flexed relative thereto and to a position permitting passage of fluid from the cylinder to the reservoir.

4. In fluid pressure mechanism, a cylinder, a piston therein, a reservoir, said cylinder being provided with a fluid passage through its wall and communicating with the reservoir, and a piston sealing cup, the forward edge of said cup normally lying ahead of said passage when the piston is in its retracted position and the rear periphery of the cup being spaced from the piston when the pressure in the cylinder is less than a predetermined value, said forward edge of said cup adapted to be moved relative to the piston and to a position uncovering said passage when the fluid pressure in the cylinder exceeds the predetermined value.

5. In fluid pressure mechanism, a cylinder, a piston therein, a reservoir, means forming a passage between the reservoir and the cylinder, and a flexible packing cup for the piston head normally preventing communication from the pressure end of the cylinder to the reservoir through said passage when the piston is in its retracted position, said packing cup and piston head being so related that said cup will be free to be flexed relative to the piston when the piston is in said retracted position and to a position permitting communication through said passage if the pressure in the cylinder exceeds a predetermined value.

6. In fluid pressure mechanism, a cylinder, a piston therein, a reservoir, means forming a passage between the reservoir and the cylinder, and a piston packing cup normally having its lip covering the passage to prevent communication from the pressure end of the cylinder to the reservoir through said passage when the piston is in its retracted position, the surface of the head of said piston and the adjacent surface of said cup being so related as to permit the outer portion of said cup to move relative to the piston when the piston is in said retracted position and to a position in which the lip uncovers the passage to thereby permit communication through said passage when the fluid pressure in the cylinder exceeds a predetermined value.

7. In fluid pressure mechanism, a cylinder, a piston therein, a reservoir, means forming a passage between the reservoir and the cylinder, and a piston packing cup normally preventing communication between the pressure end of the cylinder and the reservoir by means of said passage when the piston is in its retracted position, the head of said piston being provided with a substantially convex surface and the peripheral portion of said cup when the cup is in normal position being spaced from the adjacent piston surface, whereby the peripheral portion of said cup will be permitted to be moved to a position to permit communication through said passage when the fluid pressure in the cylinder exceeds a predetermined value.

8. In fluid pressure mechanism, a cylinder, a piston therein, a reservoir, means forming a passage between the reservoir and the cylinder, and a piston packing cup normally covering said passage when the piston is in its retracted position, the surface of the base of said cup adjacent the head of the piston being substantially convex and the peripheral portion of said cup when the cup is in normal position being spaced from the adjacent piston surface, whereby the peripheral portion of said cup will be permitted to be moved to a position to permit communication through said passage when the fluid pressure in the cylinder exceeds a predetermined value.

9. In fluid pressure mechanism, a cylinder, a piston therein having a substantial flat head surface, a reservoir, means forming a compensating port between the cylinder and the reservoir, and a flexible piston packing cup for preventing communication between the cylinder and the reservoir by means of said port when the piston is in a retracted position and the pressure of the fluid in the cylinder is less than a predetermined value, said cup comprising a base portion provided with a peripheral flange adapted to engage the wall of the cylinder and cover the compensating port, the surface of said base portion which is adapted to lie next to the piston head being convex except at the central portion which is flat, whereby the cup may be flexed to uncover the compensating port when the pressure of the fluid in the cylinder exceeds the predetermined value.

10. In fluid pressure mechanism, a cylinder, a piston therein, a reservoir, means forming a passage through the cylinder wall and in communication with the reservoir, and means within the cylinder and normally covering the passage for preventing communication from the cylinder to the reservoir when the piston is in its retracted position but movable relative to the piston when the piston is in said retracted position to uncover the passage upon occurrence of predetermined differences between the pressure of the fluid in the cylinder and the fluid in the reservoir.

BURNS DICK.